(12) United States Patent
Su et al.

(10) Patent No.: US 6,896,555 B1
(45) Date of Patent: May 24, 2005

(54) MEMORY CARD CONNECTOR

(75) Inventors: Chia-Sheng Su, Tucheng (TW); Ming-Chun Lai, Tucheng (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 0 days.

(21) Appl. No.: 10/923,684

(22) Filed: Aug. 24, 2004

(51) Int. Cl.$^7$ ............................................... H01R 23/70
(52) U.S. Cl. ...................................................... 439/630
(58) Field of Search ................................ 439/159, 160, 439/630, 636

(56) References Cited

U.S. PATENT DOCUMENTS

| | | | |
|---|---|---|---|
| 6,394,827 B2 * | 5/2002 | Nogami | 439/159 |
| 6,592,385 B1 * | 7/2003 | Chen | 439/159 |
| 6,648,694 B2 * | 11/2003 | Takamori et al. | 439/630 |
| 6,652,301 B2 * | 11/2003 | Harasawa et al. | 439/159 |
| 6,776,640 B2 * | 8/2004 | Nishioka | 439/325 |

* cited by examiner

Primary Examiner—Thanh-Tam Le
(74) Attorney, Agent, or Firm—Rosenberg, Klein & Lee (57) ABSTRACT

A memory card connector has a sliding member and a sliding pin for coupling the insertion and rejection of the memory card. The sliding member can be stayed at the position of insertion or rejection of the memory card. A retaining sheet is formed on the side of the sliding member. The end of the retaining sheet is stamped into a dimple. A retaining portion is formed on the housing of the memory card connector corresponding to the position of the dimple. The dimple can be pushed into the retaining portion when the memory card is rejected to the rejection position. The dimple can be protruded into a notch formed on the memory card by the resilience force of the retaining sheet while the notch reaches the position corresponding to the dimple. Because of the dimple leaving the position corresponding to the retaining portion of the housing; the dimple can be retained in the notch when the memory card is pushed toward the insertion position. The dimple retains the notch of the memory card for preventing the memory card from dropping out of the predetermined position or being ejected abnormally while the memory card is in the insertion state.

5 Claims, 13 Drawing Sheets

MEMORY CARD CONNECTOR

BACKGROUND OF THE INVENTION

1. Field of the Invention

The present invention generally relates to the field of a memory card connector, and in particular to a memory card connector with a card-retaining mechanism for preventing the memory card from dropping out of the predetermined position or being ejected abnormally.

2. The Related Art

Digital electronic products, such as digital still camera, MP3 player, cellular phone, etc., are required with larger capacity of storage media to satisfy the demand of digital images and music with higher qualities by the users. In general, the capacities of built-in storage media of digital electronic products are not able to meet the requirement of storage capacities by the users. Accordingly, the flash memory cards with the advantages of small size, large capacities, accessing quickly, and easy to install and carry have become the major storage media in the digital electronic products.

For accessing the flash memory cards, the digital electronic products are equipped with electrical connectors adapted to corresponding flash memory card. Most of the electrical connectors have a foolproof design to prevent the failure of the flash memory cards and the digital electronic products resulted from the wrong insert direction. Some electrical connectors have a mechanism for rejecting the flash memory cards, which keeps the angle of the insertion and rejection identical and prevents the failure of the flash memory cards and the digital electronic products.

The electrical connector with a mechanism to reject memory card has a sliding member which can be slid accompanying the insertion and rejection of the memory card. The electrical connector further comprises a circular guiding groove. The guiding groove keeps the memory card in an insertion state while the memory card inserted to a predetermined position. The guiding groove keeps the memory card in a rejection state when the memory card to a rejection position. The mechanism is so called "push—push" mechanism. The push—push mechanism is mostly set with a guiding pin. The guiding pin makes the sliding member stay in the insertion state or rejection state respectively by the slide and fastening of the guiding pin in the circular guiding groove. The sliding member is required movable relatively to the housing of the electrical connector within the electrical connector. Thus, one end of the guiding pin needs to fix on the sliding member or the housing of the electrical connector (it depends on the whole design of the electrical connector) the other end is moved and retained in the circular guiding groove. The sliding member can be switched between the insertion state and the rejection state by the relative position of the guiding pin in the circular guiding groove. Therefore, the memory card can be stayed in the insertion state or rejection state within the electrical connector.

Nevertheless, the prior electrical connector with a memory card rejecting mechanism has a problem of the abnormal rejection of the memory card. If the memory card is rejected from a predetermined position abnormally, the data in the memory card may be lost and the digital electronic product and the memory card may be damaged. Accordingly, it has become an important issue of preventing the memory card from dropping out of the predetermined position or being ejected abnormally.

SUMMARY OF THE INVENTION

It is therefore a primary objective of the present invention to provide a memory card connector which has a card-retaining mechanism for preventing the memory card from dropping out of the predetermined position or being ejected abnormally.

To achieve the above objective, the memory card connector according to the present invention has a housing, with a plurality of terminals set on the housing for electrically connecting with the adapted terminals of a memory card. The housing is provided with a circular guiding groove set thereon. The memory card connector further has a sliding member and a sliding pin disposed on the side of the housing. The sliding pin is bent into a specific shape and includes a linkage portion and a clasping portion, wherein the clasping portion can be located at a predetermined insertion position and a predetermined rejection position of the circular guiding groove alternately. The sliding member can be slid to the corresponding positions according to the insertion and the rejection of the memory card. A recess portion is formed on the front end of the sliding member. A retaining hole is further formed on the recess portion. The linkage portion of the sliding pin is penetrated through the retaining hole and retained on the recess portion. The indented depth of the recess portion on the sliding member is substantially equal to the thickness of the sliding pin so that the top of the sliding pin is substantially at the same level as the surface of the sliding member. A resilient member is arranged with one end thereof against the housing and the other end thereof against the sliding member for providing the sliding member with a restoring force toward the rejection direction of the memory card. A retaining sheet is formed on the side of the sliding member adjacent to the memory card, with the end thereof stamped into a dimple for engaging with a notch formed on the corresponding side of the memory card and retaining the memory card in the insertion position. Correspondingly, a retaining portion is formed on the side of the housing for containing the dimple when the sliding member is in the rejection position.

Thus, the memory card connector in accordance with the present invention could retain the memory card and prevent the memory card from dropping out of the predetermined position or being ejected abnormally by means of the engagement of the dimple of the retaining sheet and the notch of the memory card when the memory card is inserted into the insertion position. Furthermore, the structure of the retaining sheet in conjunction with the sliding member can reduce the difficulty and the cost of the production of the memory card connector.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
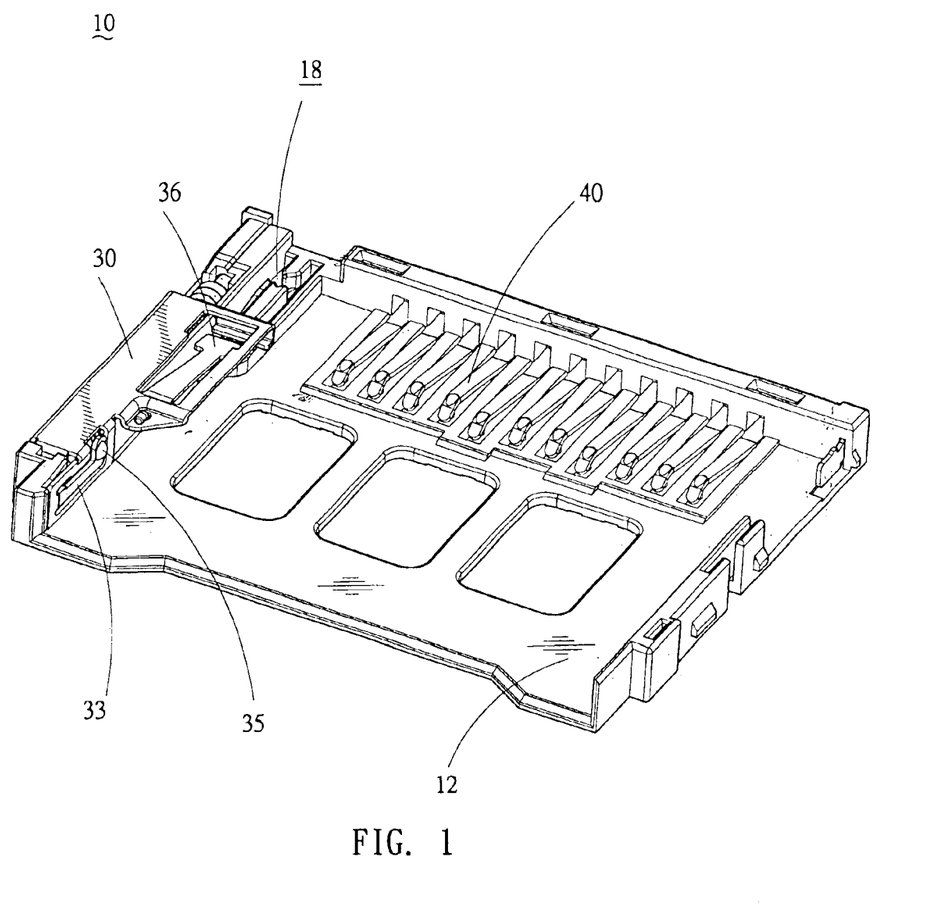
FIG. 1 is a perspective view of a memory card connector in accordance with the present invention.
Figure 2:
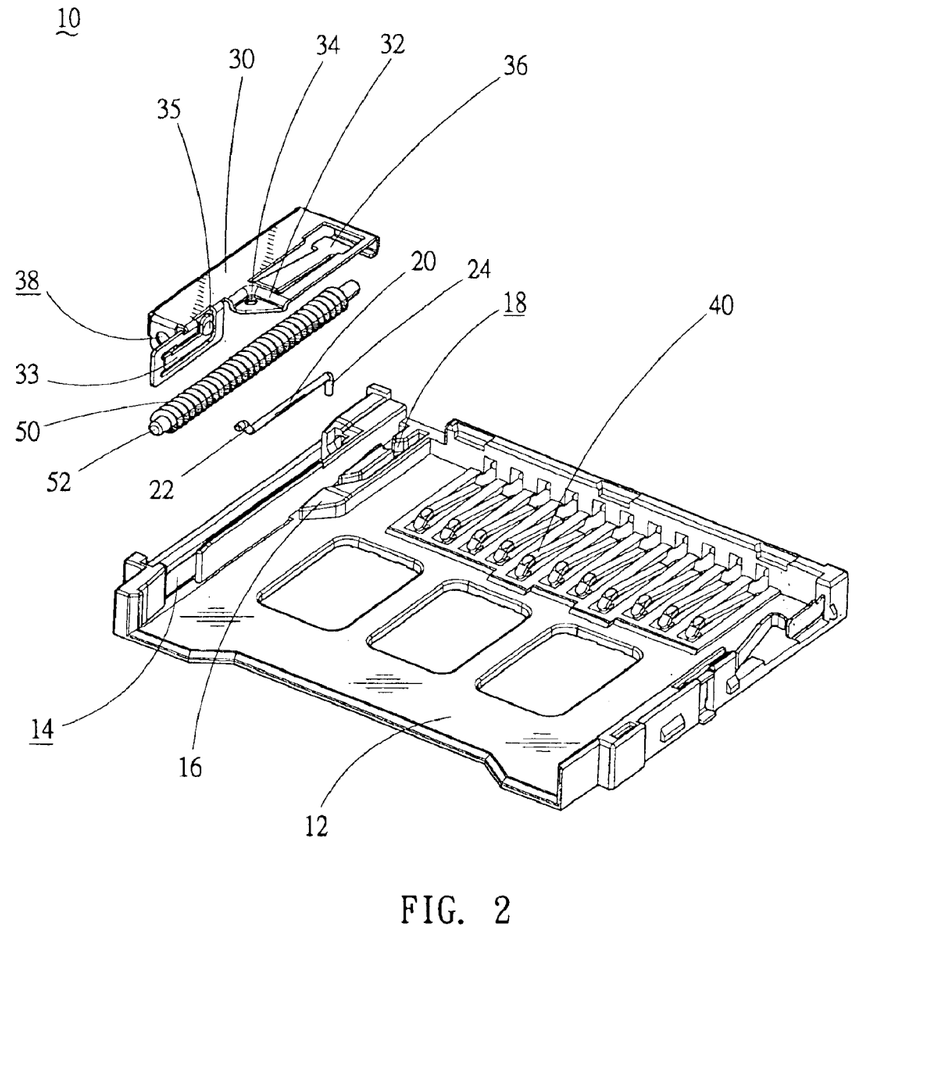
FIG. 2 is an exploded view of the memory card connector in accordance with the present invention.

Please refer to FIG. 1 and FIG. 2. FIG. 1 is a perspective view illustrating a memory card connector 10 according to the present invention. FIG. 2 is an exploded view of the memory card connector 10. The memory card connector 10 comprises a housing 12. A plurality of resilient terminals 40 are set on the housing 12. The resilient terminals 40 can be made electrical connection with corresponding terminals (not shown) of the memory card 60 while the memory card 60 is inserted in the memory card connector 10 to an insertion state. A sliding member 30 is set on the side of the memory card connector 10. The sliding member 30 is accommodated to the housing 12 for guiding the movement of insertion and rejection of the memory card 60. The sliding member 30 holds the memory card 60 in the insertion state when the memory card 60 is inserted to the insertion state. Besides, the sliding member 30 can reject the memory card 60 to a rejection state when the memory card 60 is rejected to the rejection state. A guiding rod 52 is disposed on the housing 12. A guiding hole 38 is formed on the sliding member 30. The guiding rod 52 is penetrated through the guiding hole 38 for constraining the sliding member 30 in a predetermined area. The sliding member 30 slides according to the insertion or rejection of the memory card 60 respectively. A resilient member 50 is assembled with the guiding rod 52. In this embodiment in accordance with the present invention, the resilient member 50 is a hollow coiled spring in a cylindrical shape. The resilient member 50 wraps around the outside of the guiding rod 52. One end of the resilient member 50 is against the housing 12, and the other end is against the sliding member 30. Accordingly, the sliding member 30 is provided with a restoring force toward the rejected direction of the memory card 60. The housing 12 further comprises a projecting portion 16 which is extended inwardly from the side of the memory card connector 10 at an angle for preventing the insertion of the memory card 60 in wrong directions. That is, the projecting portion 16 will block the memory card 60 when the memory card 60 is inserted in wrong directions so as to prevent the damage of the memory card connector 10 due to the wrong insertions and avoid the memory card 60 jamming within the memory card connector 10.

The memory card connector 10 has a sliding pin 20 disposed with the sliding member 30 in order to accomplish the insertion and rejection of the memory card 60. The sliding pin 20 includes a linkage portion 22 and a clasping portion 24. The linkage portion 22 of the sliding pin 20 is in a slanted S-shape and obliquely penetrated through a retaining hole 34 which is defined in a recess portion 32 formed on the front end of the sliding member 30. The clasping portion 24 is formed on the end of the sliding pin 20 opposite to the linkage portion 22. A circular guiding groove 18 is formed on the bottom of the housing 12 for positioning the clasping portion 24. The clasping portion 24 is bent downward into a substantially right angle for positioning and clasping in the corresponding locations of the circular guiding groove 18.

The sliding member 30 further comprises a depressor 36. The depressor 36 is formed with a metal sheet on the sliding member 30. The depressor 36 depresses the clasping portion 24 of the sliding pin 20 downward so as to force the free end of the clasping portion 24 resiliently retained against the bottom surface of the circular guiding groove 18. Because of the restoring force of the sliding member 30 toward the card rejection direction and the downward stress of the clasping portion 24, the clasping portion 24 can be positioned between the insertion position and the rejection position on the circular guiding groove 18 alternatively. Thus, the sliding member 30 can be retained in the corresponding position by which the clasping portion 24 stays while the memory card 60 is inserted and rejected.

A retaining sheet 33 is formed on the side of the sliding member 30 adjacent to the memory card 60. The end of the retaining sheet 33 is stamped into a dimple 35 for retaining the memory card 60 and preventing the memory card 60 from dropping out of the predetermined position or being ejected abnormally while the memory card 60 is in the insertion state. Furthermore, A retaining portion 14 is formed on the side of the housing 12 of the memory card connector 10 corresponding to the position of the dimple 35. The dimple 35 can be pushed into the retaining portion 14 when the memory card 60 is rejected to the rejection position.

Figure 3:
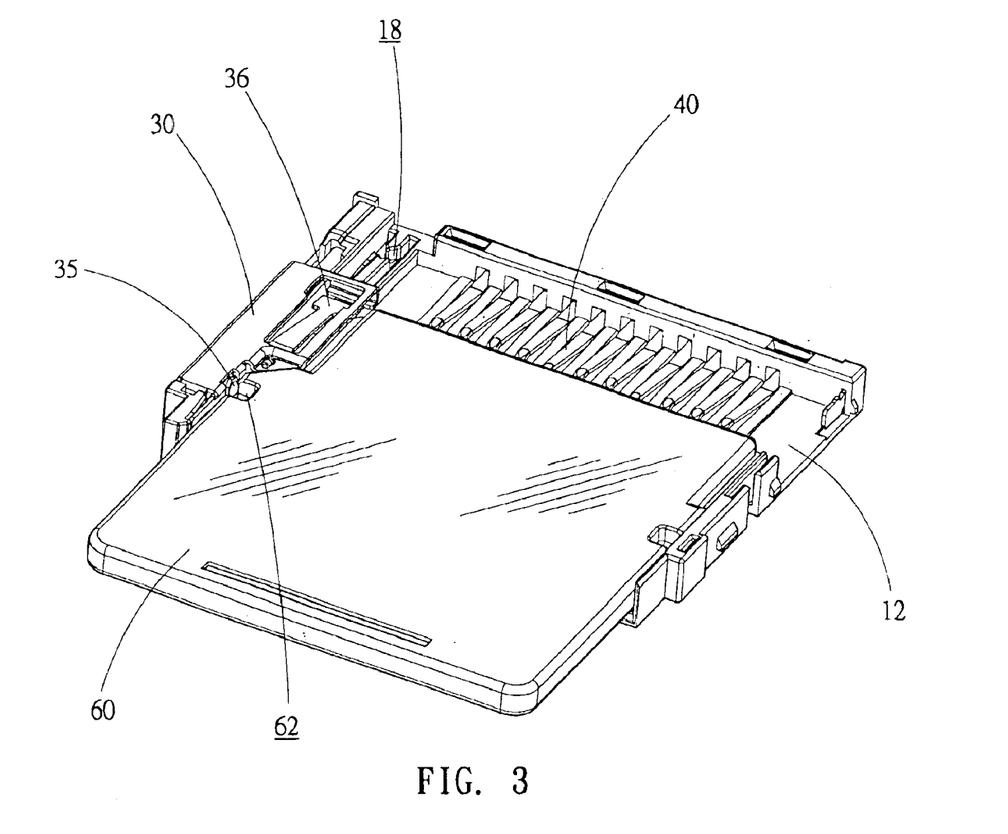
FIG. 3 is a perspective view of the memory card connector which is in the rejection state.
Figure 4:
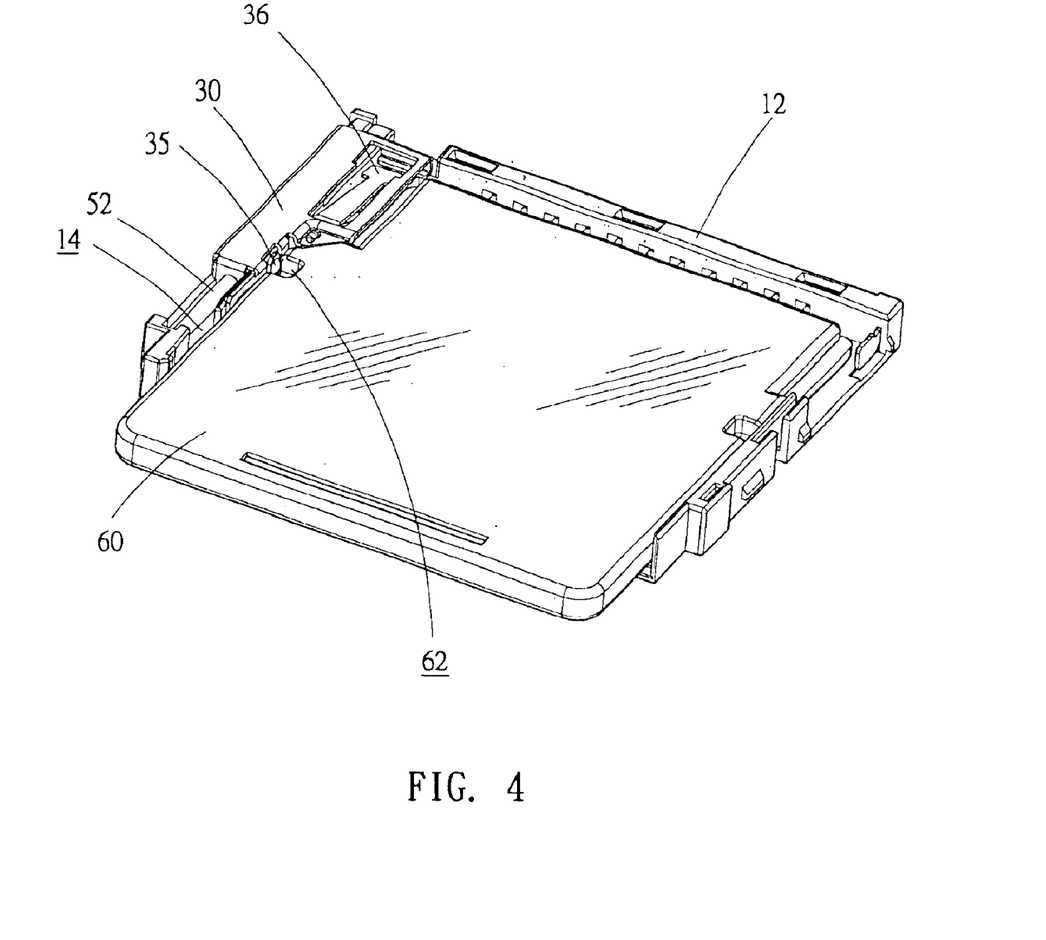
FIG. 4 is a perspective view of the memory card connector which is in the insertion state.

Please refer to FIG. 3 and FIG. 4. FIG. 3 is the perspective view of the memory card connector 10 with the memory card 60 which is in the rejection state. FIG. 4 is the perspective view of the memory card connector 10 with the memory card 60 which is in the insertion state. The memory card 60 can be a Mini Secure Digital card (Mini SD card). A notch 62 is formed on the side of the memory card 60 for engaging with the dimple 35 of the retaining sheet 33. As the memory card 60 is inserted into the memory card connector 10, the notch 62 is corresponding to the position of the dimple 35 of the retaining sheet 33. In the meanwhile, the dimple 35 is in the position corresponding to the retaining portion 14 of the housing 12. Firstly, the dimple 35 will be pushed into the retaining portion 14 slightly. The dimple 35 can be protruded into a notch 62 of the memory card 60 by the resilience force of the retaining sheet 33 while the notch 62 reaches the position corresponding to the dimple 35. Because of the dimple 35 leaving the position corresponding to the retaining portion 14 of the housing 12, the dimple 35 can be retained in the notch 62 when the memory card 60 is pushed toward the insertion position. The dimple 35 retains the notch 62 for preventing the memory card 60 from dropping out of the predetermined position or being ejected abnormally while the memory card 62 is in the insertion state. Contrarily, as the memory card 60 is rejected from the insertion position to the rejection position, the dimple will back to the position corresponding to the retaining portion 14 of the housing 12. Therefore, the dimple 35 can be pushed into the retaining portion 14 instead of retaining the notch 62, and the memory card 60 can be drew out.

Figure 5:
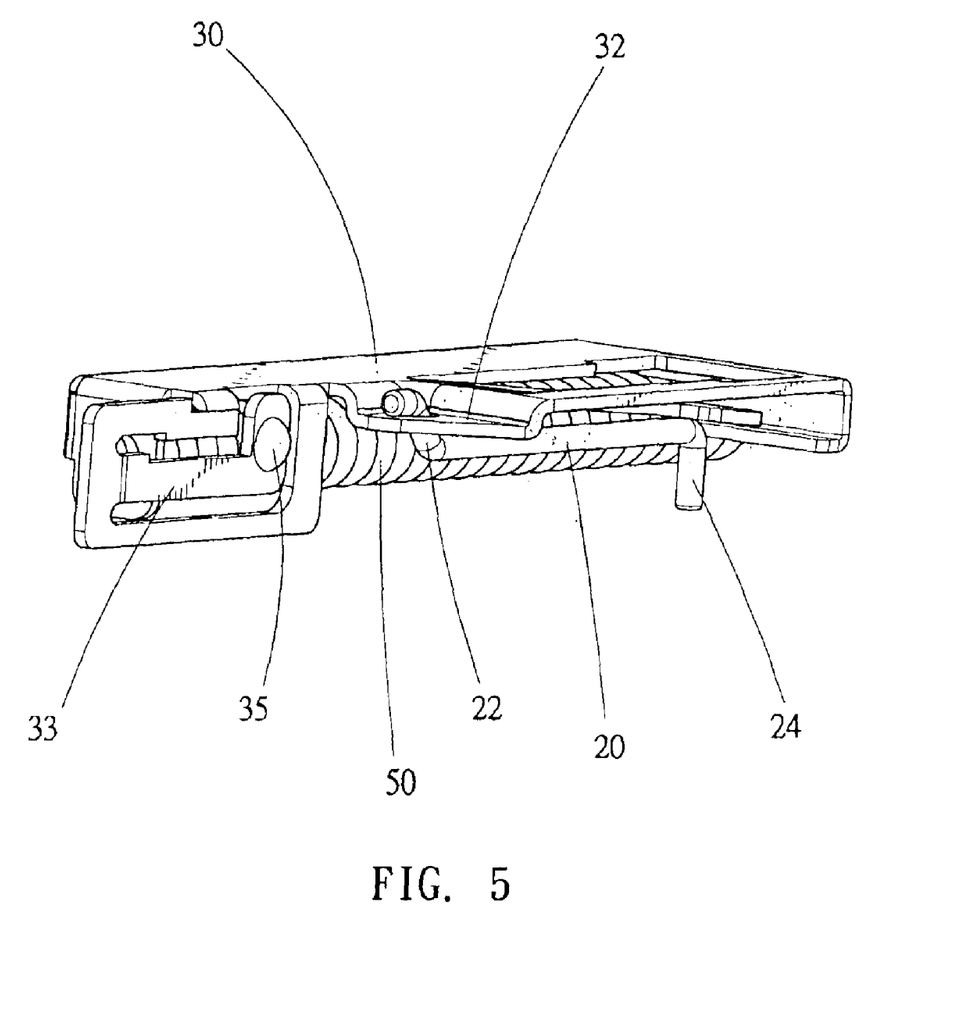
FIG. 5 is an angled view of the sliding member according to the present invention.
Figure 6:
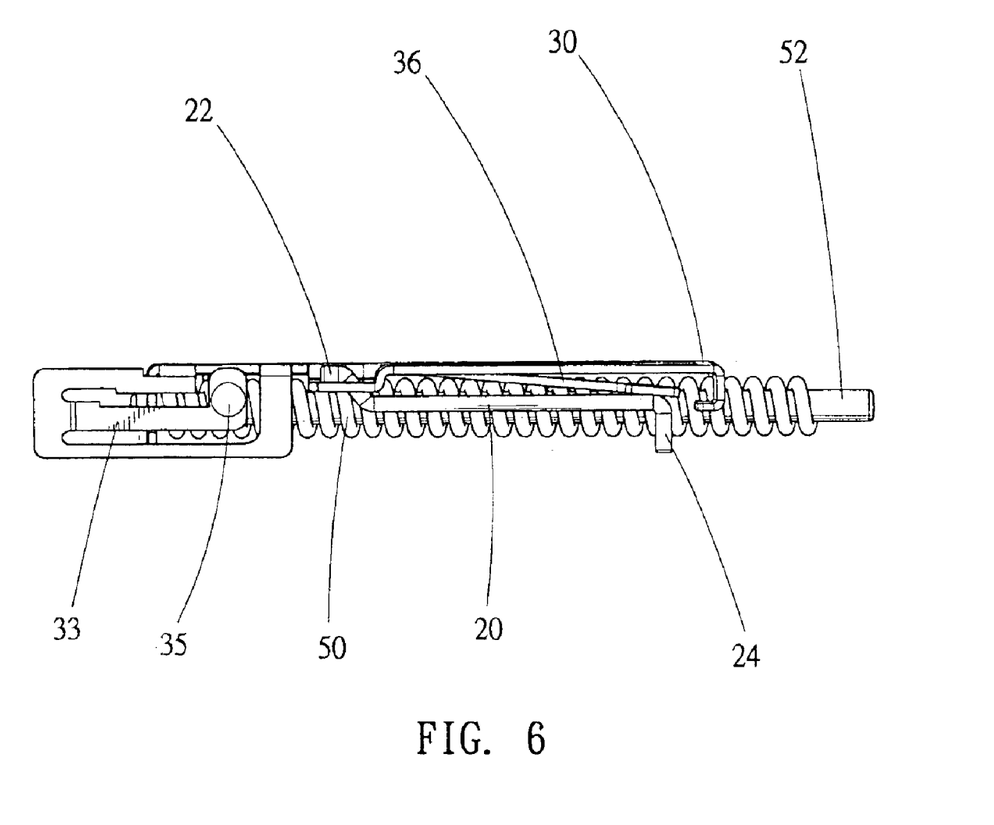
FIG. 6 is a lateral view of the combination of the sliding member and the guiding rod.

Please refer to FIG. 5 and FIG. 6. FIG. 5 and FIG. 6 are the views of the combination of the sliding member 30 and the guiding rod 52 from different angles. The indented depth of the recess portion 32 on the sliding member 30 is substantially equal to the thickness of the sliding pin 20. Therefore, the top of the sliding pin 20 is substantially at the same level as the surface of the sliding member 30 after the linkage portion 22 of the sliding pin 20 is inserted into the retaining hole 34. The edge of the recess portion 32, which is contacted with and against the memory card 60, is designed into a bevel edge for being against the corresponding bevel edge of the memory card 60 in parallel relation. In such manner, the sliding member 30 can be pushed into the insertion stale according to the insertion of the memory card 60 via engagement of the two complementary bevel edges and retained in the insertion state when the memory card 60 is inserted. The memory card 60 can be retained in the insertion state while the memory card 60 is pushed into the insertion state and held by the memory card connector 10. Contrarily, the memory card 60 can be rejected to the rejection state by the restoring force of the resilient member 50 of the sliding member 30 when the clasping portion 24 of the sliding pin 20 escapes from the insertion position.

Figure 7:
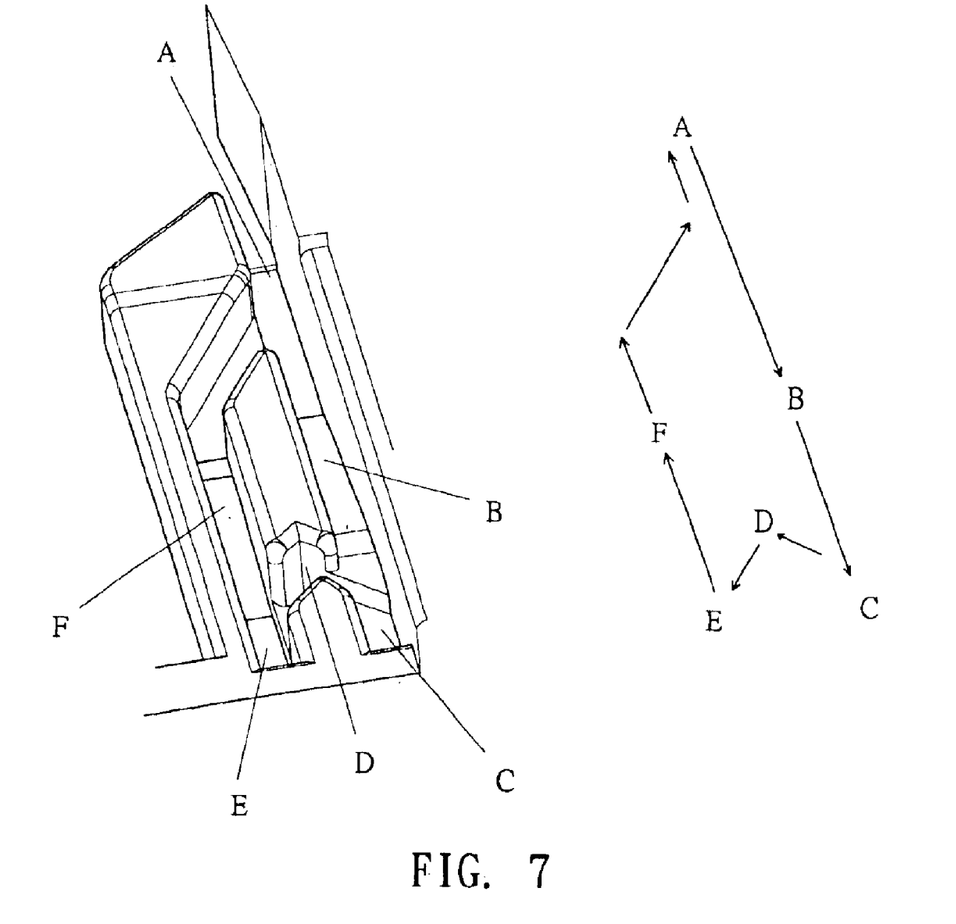
FIG. 7 is a schematic view of the path of the clasping portion moving within the circular guiding groove.
Figure 7A:
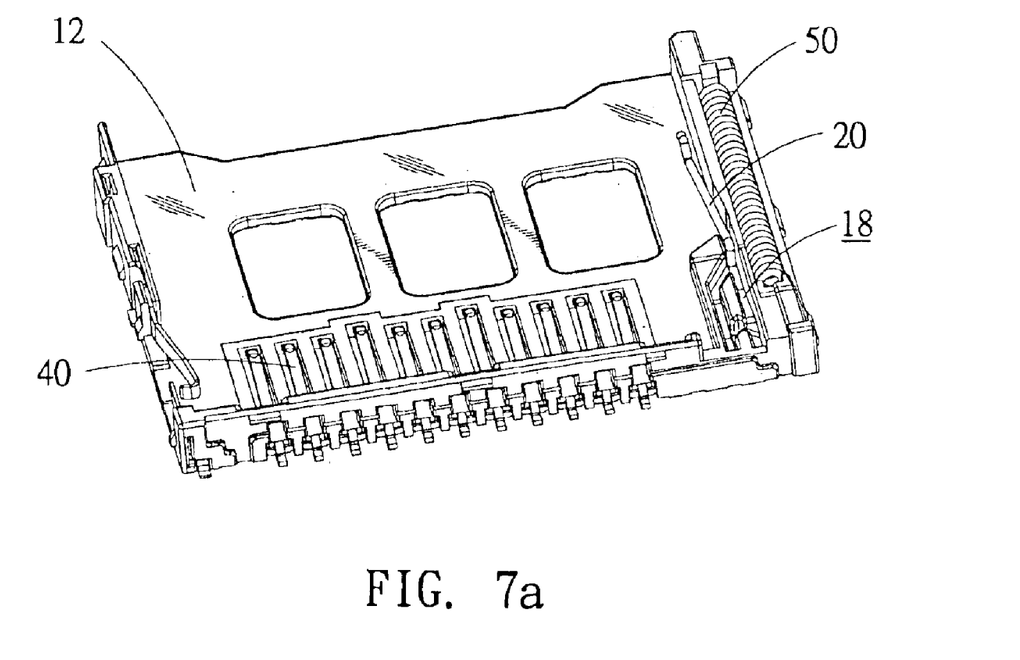
FIG. 7a is a schematic view of the clasping portion located at position A of the circular guiding groove.
Figure 7B:
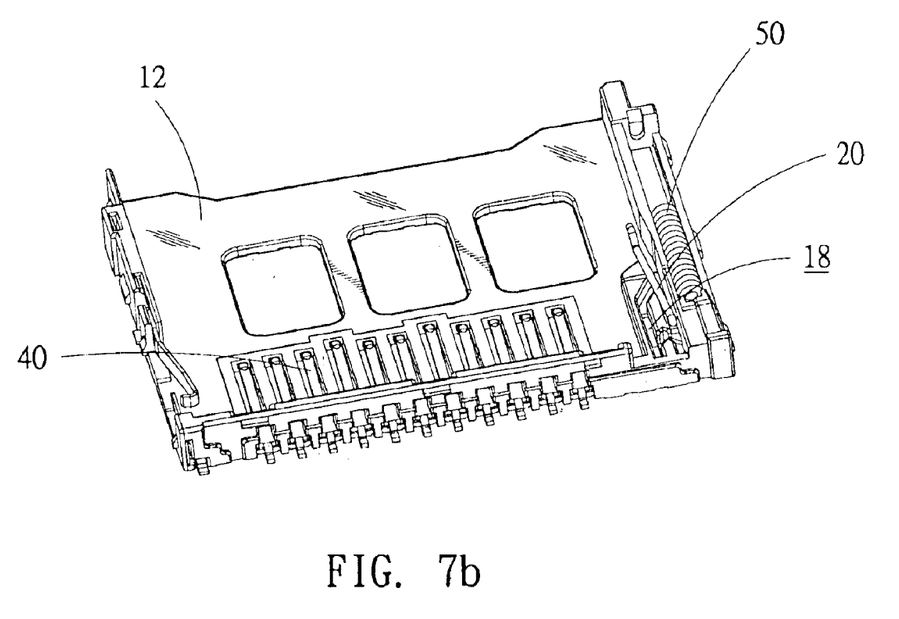
FIG. 7b is a schematic view of the clasping portion located at position B of the circular guiding groove.
Figure 7C:
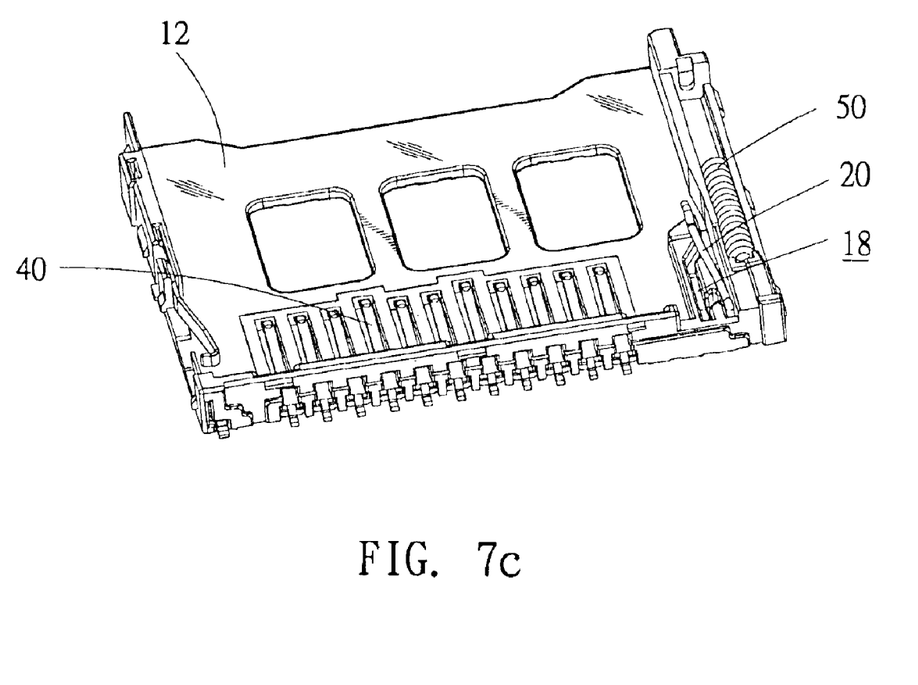
FIG. 7c is a schematic view of the clasping portion located at position C of the circular guiding groove.
Figure 7D:
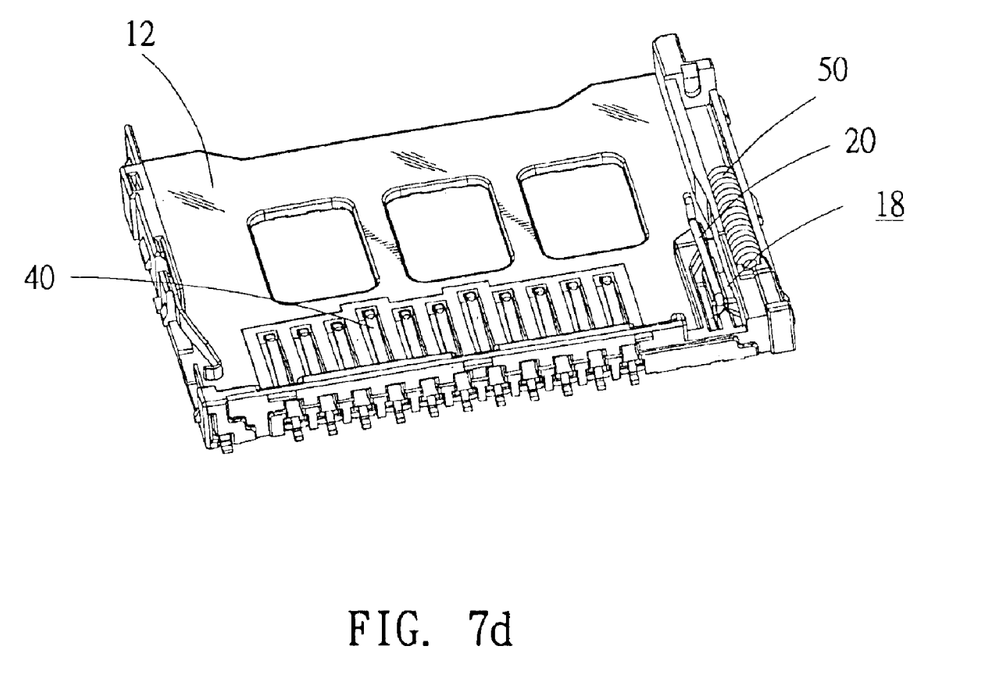
FIG. 7d is a schematic view of the clasping portion located at position D of the circular guiding groove.
Figure 7E:
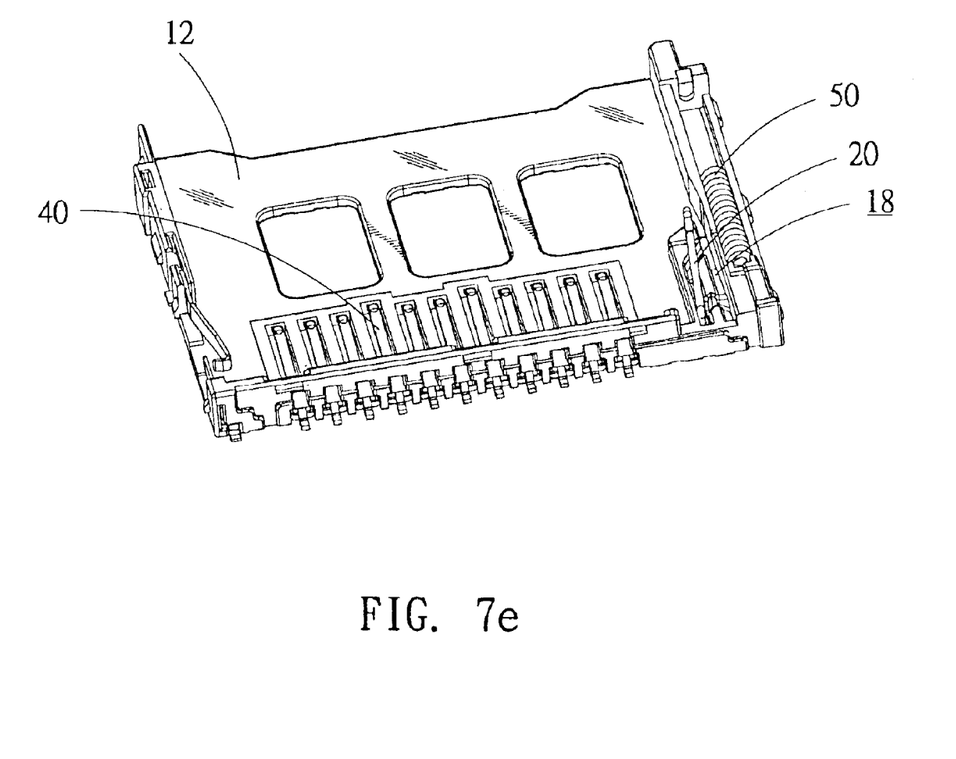
FIG. 7e is a schematic view of the clasping portion located at position E of the circular guiding groove.
Figure 7F:
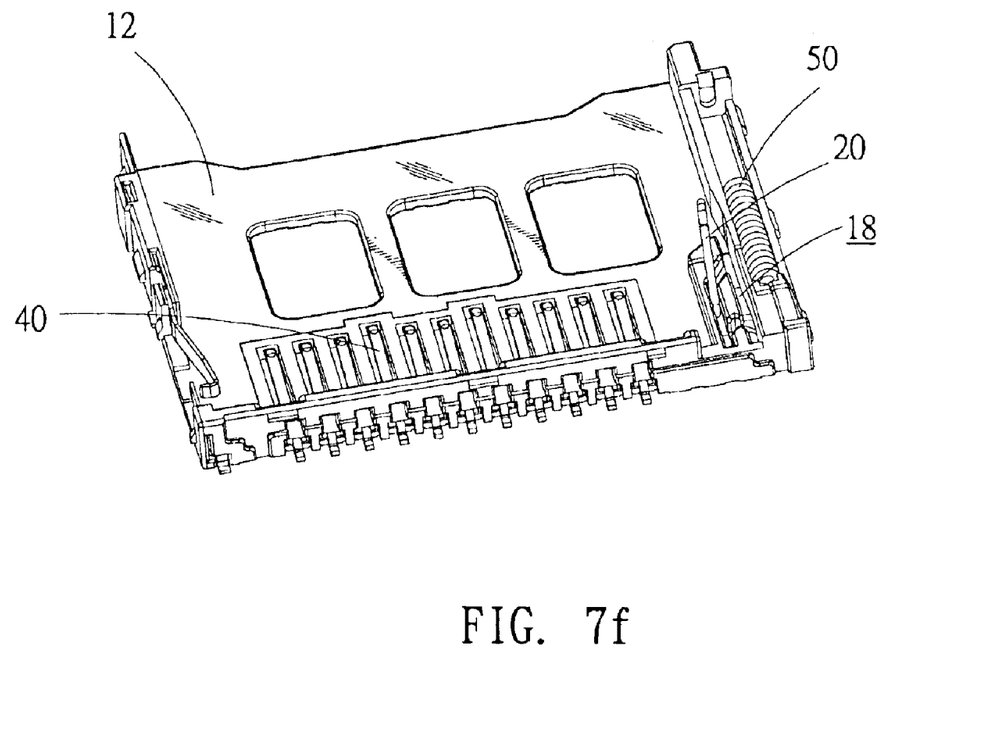
FIG. 7f is a schematic view of the clasping portion located at position F of the circular guiding groove.

Please refer to FIG. 7 and FIG. 7a to FIG. 7f. FIG. 7 is the diagram illustrating the movement of the clasping portion 24 in the circular guiding groove 18. FIG. 7a to FIG. 7f are the views of each state of the clasping portion 24 in the circular guiding groove 18. The clasping portion 24 is at the position A when the sliding member 30 is stayed in the rejection state. The sliding member 30 is pushed from the rejection state to the insertion state, with the clasping portion 24 moving from position A to position B. Because of the boundary of the position B and position C is a slanted step, the clasping portion 24 cannot back to position B from position C after the clasping portion 24 is pushed past the boundary between position B and position C. The sliding member 30 has been in the insertion state since the clasping portion 24 reached the position C. As the sliding member 30 has the restoring force toward the direction of rejection by pressing the resilient member 50, the clasping portion 24 will slide to the position D and retained at the position D after reaching the position C. Thus, the sliding member 30 can be retained in the insertion state.

The sliding member 30 is pushed a little distance toward the direction of insertion for pushing the clasping portion 24 out of the position D and forward to the position E when the sliding member 30 is rejected from the insertion state to the rejection state. Similarly, the boundary of the position D and the position E is a slanted step, hence the clasping portion 24 cannot backed to the position D from the position E. The clasping portion 24 will continue to slide through the position F to the position A along the circular guiding groove 18 due to the restoring force of the sliding member 30. The sliding member 30 is retained in the rejection state after the clasping portion 24 reached the position A. Because of the boundary of the position F and the position A is a slanted step, the clasping can be pushed forward to the position B instead of the position F from the position A when the sliding member 30 is pushed from the rejection state to the insertion state next time.

In contrast to the prior art, the memory card connector 10 in accordance with the present invention could retain the memory card 60 and prevent the memory card 60 from dropping out of the predetermined position or being ejected abnormally by means of the engagement of the dimple 35 of the retaining sheet 33 and the notch 62 of the memory card 60 when the memory card 60 is inserted into the insertion position. Furthermore, the sliding member 30 of memory card connector 10 in accordance with the present invention is provided with the recess portion 32. The linkage portion 22 of the sliding pin 20 is in a slanted S-shape and obliquely penetrated through the retaining hole 34 of the recess portion 32. The clasping portion 24 is formed on the end of the sliding pin 20 opposite to the linkage portion 22. The top of the sliding pin 20 is substantially at the same level as the surface of the sliding member 30. The structure combined of the recess portion 32 of the sliding member 30 and the sliding pin 20 is able to reduce the thickness of the memory card connector and minimize the probability of failure.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A memory card connector comprising:

a housing;

a plurality of terminals set on housing for electrically connecting with the adapted terminals of a memory card;

a circular guiding groove set on the housing;

a sliding pin bent into a specific shape, which includes a linkage portion and a clasping portion, wherein the clasping portion can be located at a predetermined insertion position and a predetermined rejection position of the circular guiding groove alternately;

a sliding member which can be slid to the corresponding positions according to the insertion and the rejection of the memory card, a recess portion formed on the front end of the sliding member, a retaining hole formed on the recess portion, the linkage portion of the sliding pin penetrated through the retaining hole and retained on the recess portion, the indented depth of the recess portion on the sliding member substantially equal to the thickness of the sliding pin and the top of the sliding pin being substantially at the same level as the surface of the sliding member;

a resilient member disposed with one end thereof against the housing and the other end thereof against the sliding member for providing the sliding member with a restoring force toward the rejection direction of the memory card;

a retaining sheet formed on the side of the sliding member, with the end thereof stamped into a dimple for engaging with a notch formed on the corresponding side of the memory card and retaining the memory card in the insertion position; and a retaining portion formed on the side of the housing corresponding to the position of the dimple for containing the dimple when the sliding member is in the rejection position.

2. The memory card connector as claimed in claim 1, wherein the linkage portion is in a slanted S-shape and formed on one end of sliding pin, and the clasping portion is formed on the other end of the sliding pin and bent downward into a substantially right angle.

3. The memory card vector as claimed in claim 1, wherein the housing further comprising a projecting portion which is extended inwardly at an angle for preventing the insertion of the memory card in wrong directions.

4. The memory card connector as claimed in claim 1, wherein a guiding rod is disposed on the housing, a guiding hole is formed on the sliding member, the guiding rod is penetrated through the guiding hole for constraining the sliding member in a predetermined area.

5. The memory card connector as claimed in claim 4, wherein the resilient member is a hollow coiled spring in a cylindrical shape which wraps around the outside of the guiding rod.

* * * * *